United States Patent
Scott

[19]

[11] Patent Number: 6,127,648
[45] Date of Patent: Oct. 3, 2000

[54] LASER-EQUIPPED MACHINE TOOL HAVING A RETRACTABLE SCRAP REMOVAL SYSTEM

[75] Inventor: William B. Scott, Rochelle, Ill.

[73] Assignee: W. A. Whitney Co., Rockford, Ill.

[21] Appl. No.: 09/302,277

[22] Filed: Apr. 30, 1999

[51] Int. Cl.[7] .................................................. B23K 26/16
[52] U.S. Cl. ..................... 219/121.67; 83/158; 83/167; 219/121.82
[58] Field of Search ................... 219/121.67, 121.82, 219/121.72, 121.58; 83/101, 102, 105, 160, 158, 167

[56] References Cited

U.S. PATENT DOCUMENTS

| | | | |
|---|---|---|---|
| 4,452,115 | 6/1984 | Bredow . | |
| 5,585,015 | 12/1996 | Hayashi et al. | 219/121.67 |
| 5,648,002 | 7/1997 | Omote | 219/121.82 |

FOREIGN PATENT DOCUMENTS

| | | | |
|---|---|---|---|
| 61-189896 | 8/1986 | Japan | 219/121.72 |
| 5-161990 | 6/1993 | Japan | 219/121.67 |
| 6-99296 | 4/1994 | Japan | 219/121.67 |

OTHER PUBLICATIONS

Trumpf Brochure, Five Axes Laser Processing Center, no publication date.

*Primary Examiner*—Geoffrey S. Evans
*Attorney, Agent, or Firm*—Leydig, Voit & Mayer, Ltd.

[57] ABSTRACT

A scrap removal system for a laser-equipped machine tool. The scrap removal system has a home position in which all of its components, including a scraper assembly and a drive are out of the range of the laser beam, so that they are protected from laser damage. A stationary slag and scrap collection bed is provided below the cutting zone. The scrap removal system is periodically activated, at times when the laser is off. The drive has drive components which span the length of the bed out of the path of the laser. The drive is energized to pull a scraper assembly through the machine with a plow having a lower surface in contact with the stationary collection bed for scraping slag and pushing it toward the open end of the machine. When the machine reaches the end of its travel, the drive, as it continues its motion, automatically raises the plow, pushes the scrap off the end, then returns to its home and protected position, with the plow out of contact with the collection bed so as not to pull debris back into the machine. The scraper assembly remains in its home position until the next actuated cycle.

14 Claims, 14 Drawing Sheets

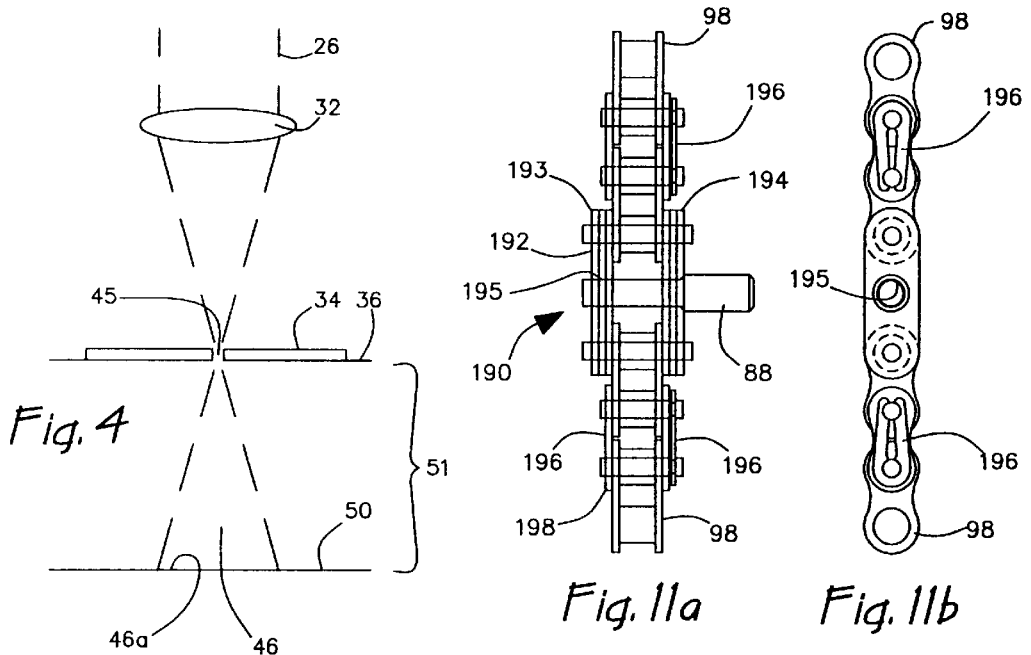
Fig. 4
Fig. 11a
Fig. 11b
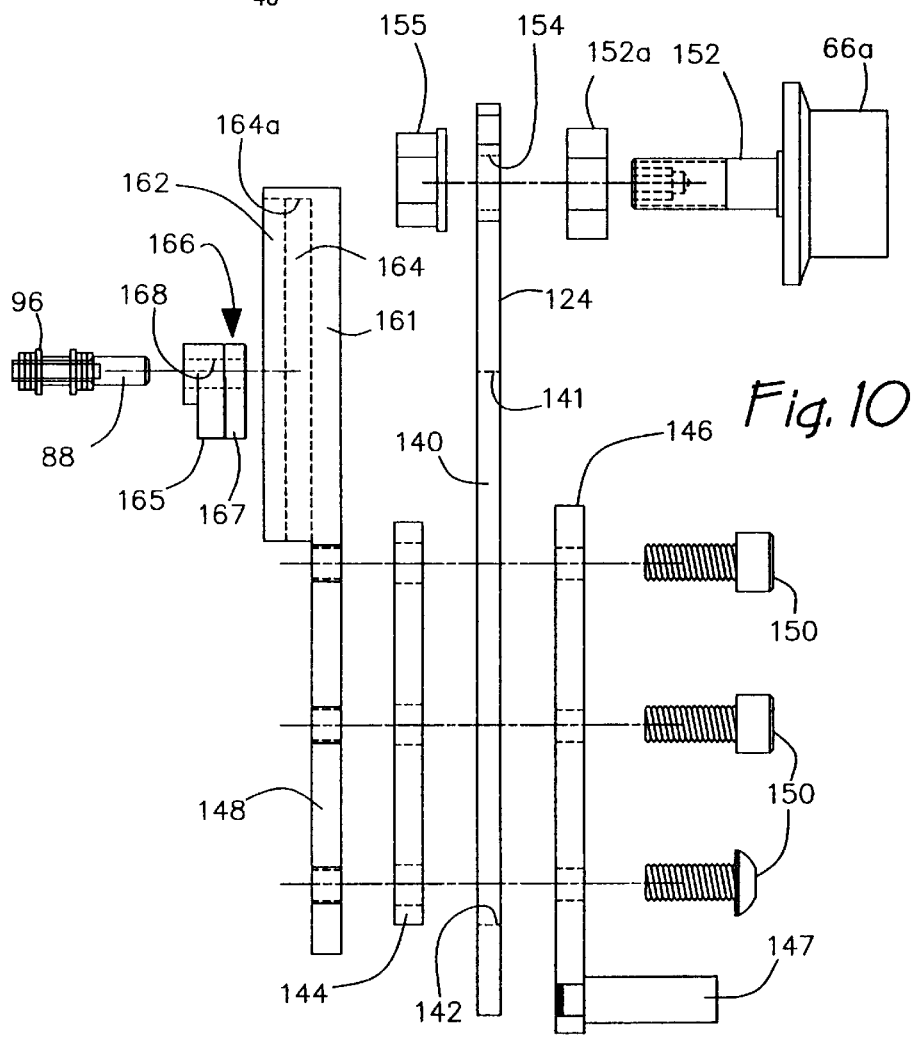
Fig. 10

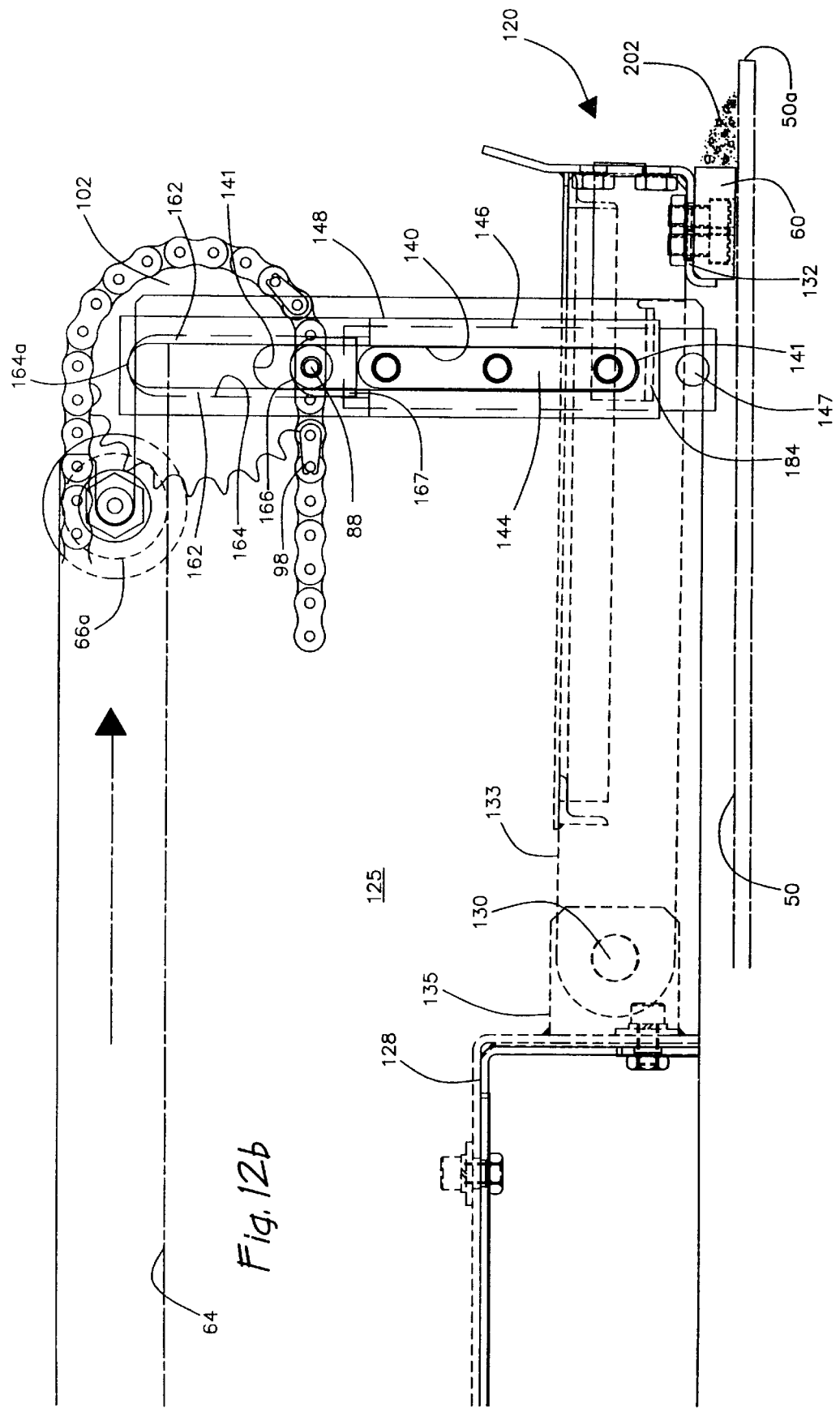

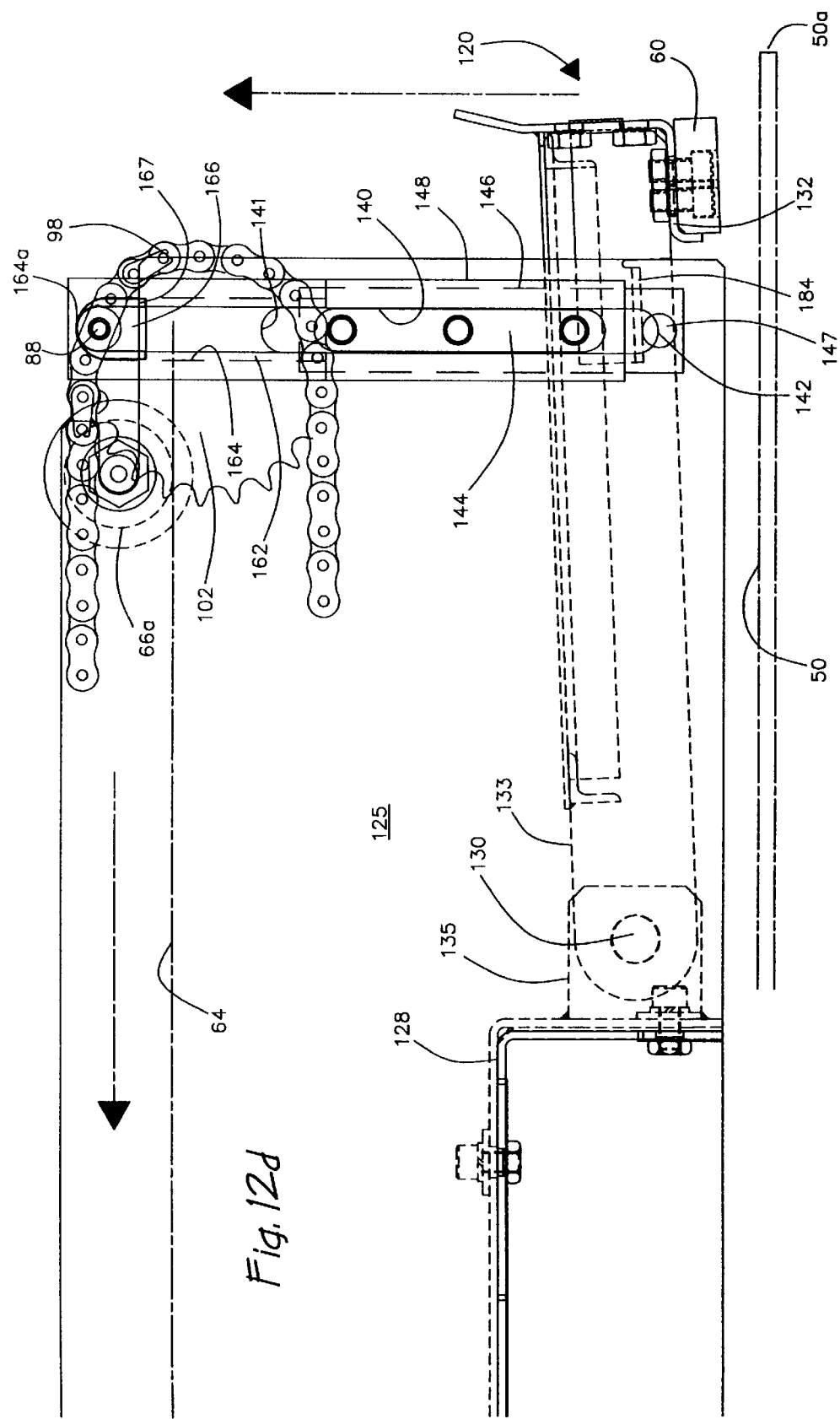

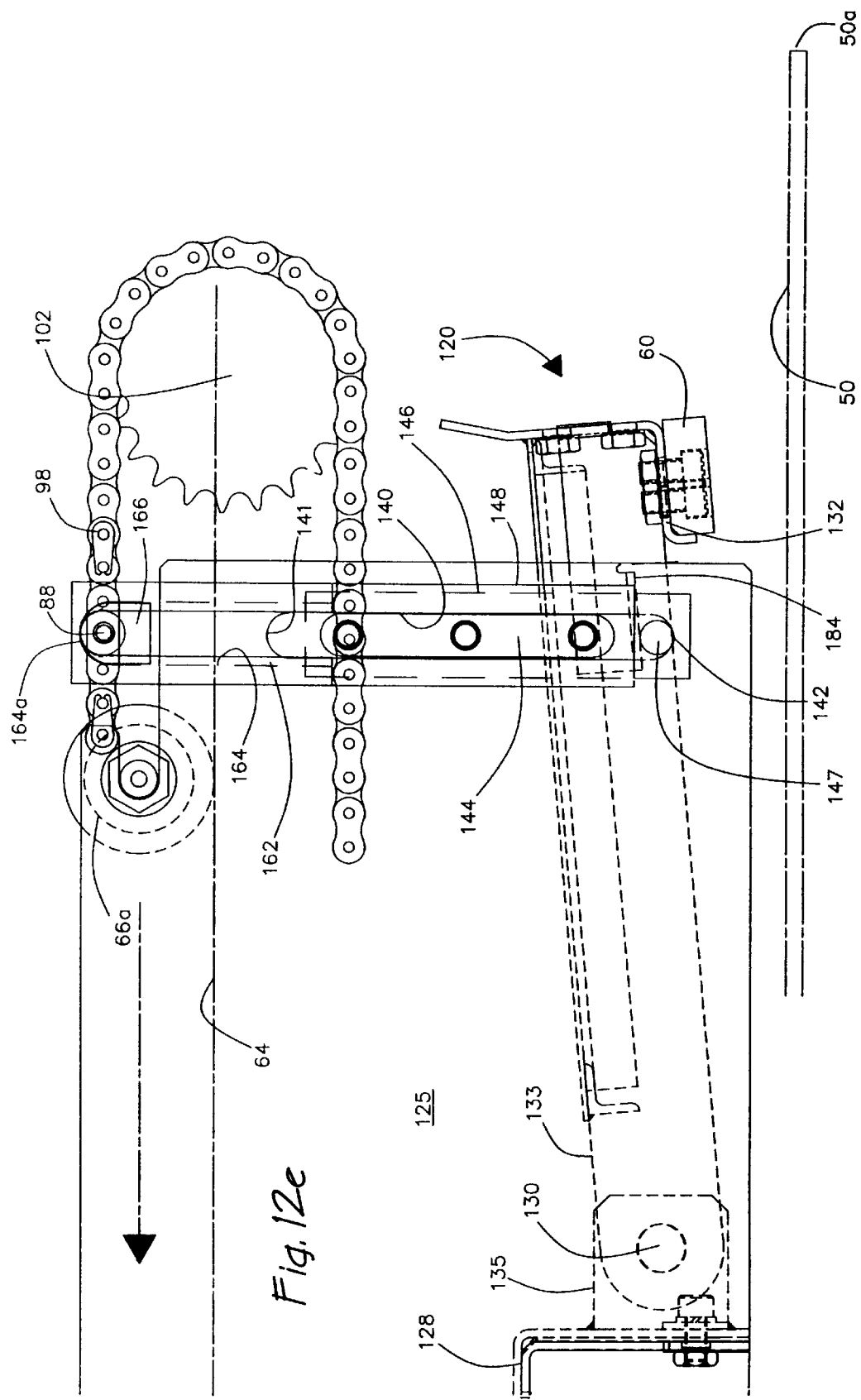

LASER-EQUIPPED MACHINE TOOL HAVING A RETRACTABLE SCRAP REMOVAL SYSTEM

FIELD OF THE INVENTION

The present invention generally relates to machine tools, and more particularly relates to machine tools using lasers for cutting metal and other materials.

BACKGROUND OF THE INVENTION

Laser-equipped machine tools are often used to cut parts from sheet metal and relatively thin plate. In such machine tools a laser beam, concentrated by a focusing lens or mirror to a small diameter spot, is directed to an appropriate position above, on or below the surface of the material to be cut. The laser beam is directed from the focusing optic through a nozzle disposed immediately above the material workpiece, with a pressurized gas being directed through the nozzle, typically coaxially with the laser beam, to assist making the cut. The pressurized gas interacts with the laser beam and material, facilitating the cutting process, and creates a gas stream which carries the removed material away from the cut.

Laser-equipped machine tools are Computer Numerically Controlled and are manufactured in many configurations and sizes and with lasers of various types and power. In one configuration, flying optic, the cutting head is adapted for movement along one axis, such as the Y-axis which is mounted on a bridge, and the bridge is adapted for movement in an orthogonal, X-axis. The work is supported on a stationary pallet or table below the bridge. Movement of the cutting head is coordinated with movement of the bridge to define a precise path on the part. The cutting head and laser are controlled to pierce and cut the workpiece to form holes and shapes in the material, then to cut the part from the material.

When using laser-equipped cutting machine tools it is advantageous to utilize optics with different focal lengths to cut various thicknesses of material. The focal length of the optic contributes to the diameter of the focal spot and thus the energy density, Watts per unit area, at the focal spot. Shorter focal length optics create smaller focal spots having higher energy densities. The focal length of the optic also contributes to the depth of focus of the focal spot with longer focal lengths having greater depth of focus. Shorter focal length optics are advantageous for cutting thinner materials while longer focal length optics are advantageous for cutting thicker material. Primarily the focal length of the optic and the power level of the laser contribute to the energy density remaining in the laser beam at distances beyond the workpiece.

Many same or different parts of common thickness and material type may be cut from a sheet or plate. Such groups of parts are commonly referred to as a nest. Left over material, after the parts have been removed, is referred to as a remnant or a skeleton. A small remnant which falls from a hole cut in a part is called a slug. Remains of material from the cut is called slag. Resolidified material clinging to the part is called dross. The mixture of slugs and slag residue from cutting sheet material is generally called scrap.

Various means for collecting and removing scrap from laser cutting machines have been utilized. One version is to allow the scrap to accumulate on the floor or on a platform or bed disposed below the cutting area. When the accumulation is excessive it is shoveled out. This method is advantageously low cost. It also has disadvantages. The machine must be shut down while the scrap is removed, reducing productivity. Debris falling from the shovel, can land on way covers or machine parts, where not wanted, leading to premature failures.

Another version is to provide one or more scrap collecting pans under the cutting area to collect the scrap. This solution is also advantageously low cost. It also has disadvantages. The machine is normally shut down while the scrap is removed, reducing productivity. If an excessive amount of scrap is allowed to accumulate, the pans are very difficult to remove. The scrap pans may be large and hard to handle.

Another version is to provide a conveyor disposed below the cutting area to carry or drag the scrap from the machine. While this arrangement costs more, it also improves machine productivity by eliminating machine shut down for removal of scrap. Conveyor systems, however, can increase the height of the bed by an unacceptable amount, and are also prone to damage.

As lasers, with beam qualities suitable for cutting, are developed and become available in higher-powered versions, machines are developed having ability to cut greater thicknesses of material. Adapting high power lasers to cut thicker materials leads to using focusing lenses with longer focal lengths. Below the focal point, a laser beam expands at approximately the same rate that it was focused. For example, if a 35 mm diameter laser beam is focused by a lens with a 10" focal length, then, 10" below the focal point, unless absorbed by the material cut, the beam would be about 35 mm in diameter again. Twenty inches below the focal point the beam would be about 70 mm in diameter. This remnant diverging beam from a high power lasers has considerable capability to cause damage. For example in testing leading to the present invention, a 0.125" thick aluminum plate was scuffed with steel slag, then a 38 mm diameter 5500 Watt beam was directed at the surface. The aluminum was cut through in 40 seconds. Similar tests were made with 0.25" inch thick stainless steel and carbon steel. Both were cut through in well under a minute. These tests indicated that a scrap removal system underlying the cutting area of a high power laser system, with long focal length optics in use, would be at considerable risk of being damaged by the remnant laser beam.

SUMMARY OF THE INVENTION

In view of the foregoing it is a general aim of the present invention to provide a scrap removal system suitable for use with a high power laser-equipped machine tool, which has substantially reduced risk of being damaged by the laser beam.

It is an object of the present invention to provide a scrap removal system for a laser-equipped machine tool which automatically removes the scrap produced by the laser, but which is protected from damage from the remnant laser beam.

It is a still further objective of the present invention to provide a laser-equipped machine tool scrap removal system which can scrape the scrap from the collection bed in a cleaning pass in one direction then retract to a home position protected from the cutting zone until the next cleaning pass is required.

It is still another objective of the present invention to provide a scrap removal system for a high power laser-equipped machine tool which extends across the collection bed to scrape away scrap and which is elevated from the collection bed when retracted to the stowed position to thereby prevent scrap from being retracted therewith.

An object of the present invention is to provide a sturdy and reliable scrap removal system which is positively and reliably driven to remove the scrap, yet in which all of the components are out of the path of the laser during cutting.

A more particular object of the invention is to provide a scrap removal system which is operable with a stationary scrap collecting bed which serves as a laser shield, and which therefore operates entirely above the stationary scrap collection bed. A further object in that regard is to provide such a system which accomplishes the drive and the manipulation of the scraper elements using a single remotely positioned prime mover.

It is a feature of the invention that the scrap removal system is operated by a chain drive for strength, reliability and simplicity. The chain drive is positioned outside of the laser cutting area, and is shielded therefrom. A long scraper, traversing the width of the scrap bed is translated across the bed for removal of scrap. The linkage interconnecting the chain and the scraper serves to raise the blade for return to its stowed protected position. These tasks are all accomplished by motive power from a single non-reversible motor which is safely positioned well away from the cutting zone.

It is a feature of the invention that the scrap collection surface is stationary, a plow is traversed across the stationary bed to remove scrap, and a chain drive controls multiple positions of the plow for (a) a cleaning pass with the plow down, (b) raising the plow to an inoperative position, and (c) retraction to the stowed protected position.

These and other objectives and features of the invention will become more apparent from the following detailed description when taken in conjunction with the accompanying drawings.

BRIEF DESCRIPTION OF THE DRAWINGS

FIG. 4 is a diagram illustrating the remnant laser beam;

FIG. 10 is an exploded view showing the parts which make up one of the scraper assembly drive linkages;

FIGS. 11a and 11b are side and front elevations of a link set which carries the drive pin; and FIGS. 12a–12e are sequential diagrams taken generally along the line 12—12 of FIG. 3, showing the scrap removal system and drive in a number of operating positions.

Figure 1:
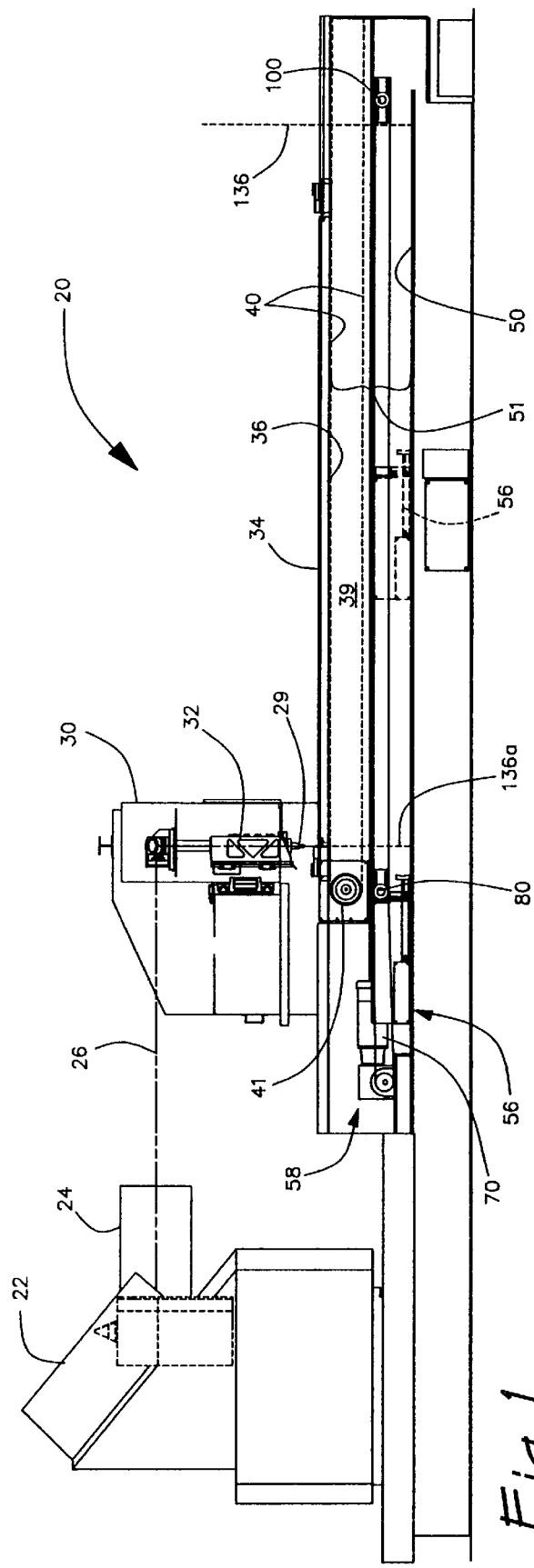
FIG. 1 is a sectional elevation of a laser-equipped machine tool taken along the line of 1—1 of FIG. 2, with the machine enclosure removed, and having a scrap removal system exemplifying the present invention.

While the invention is susceptible of various modifications and alternative constructions, certain illustrative embodiments thereof have been shown in the drawings and will be described below in detail. It should be understood, however, that there is no intention to limit the invention to the specific forms disclosed. On the contrary, the intention is to cover all modifications, alternative constructions and equivalents falling within the spirit and scope of the invention as defined by the appended claims.

DETAILED DESCRIPTION OF THE PREFERRED EMBODIMENT

Referring now to the drawings, and with specific reference to FIG. 1, a preferred embodiment of the present invention is generally depicted as embodied in machine tool 20. By way of background machine tool 20 includes a laser source 22 which directs a high power laser beam to a collimator 24, which in turn directs a collimated laser beam 26 (See FIG. 2) to first bending mirror 27. The laser beam 26 is then directed to second bending mirror 28 and then to cutting head 30 which includes a focusing optic 32 (See FIG. 4) which focuses the laser beam onto workpiece 34. The laser beam 26 is projected through a nozzle 29 at the base of the cutting head along with a supply of assist gas, such as nitrogen or oxygen. The laser beam and assist gas interact with the metal to cut the workpiece 34. While an important use of laser cutting machines is the cutting of metal, it will be noted that other materials can be cut, and the invention is not limited to lasers for cutting metal.

Metal plate 34 is supported on the work surface of pallet 36 which is constructed for minimum interference with the laser beam, and to allow slag and scrap to readily fall therethrough. The pallet 36 is preferably made up of a plurality of bars spanning the pallet width, and turned on edge so that their narrow cross-section is presented to the laser. The upper edge of each bar is serrated in large tooth like fashion to support the workpiece at a plurality of points in bed-of-nails fashion. Such pallets are known in the laser cutting art, and will not be further described, except to note the feature that the scrap material generated during the cut will readily fall through the pallet. The pallet 36 can be moved into the work zone of the cutting head 30 using pallet drive system 39 which in the depicted embodiment includes a chain 40 and drive sprocket 41. It is also to be understood that the pallet 3 6 is actually one of two pallets which can be moved relative to the cutting head 30. While one pallet supporting a plate 34 is positioned in the machine for cutting, a second pallet is positioned in a loading station to have cut parts unloaded and raw material loaded. Such an arrangement provides for a more productive machine tool.

Figure 2:
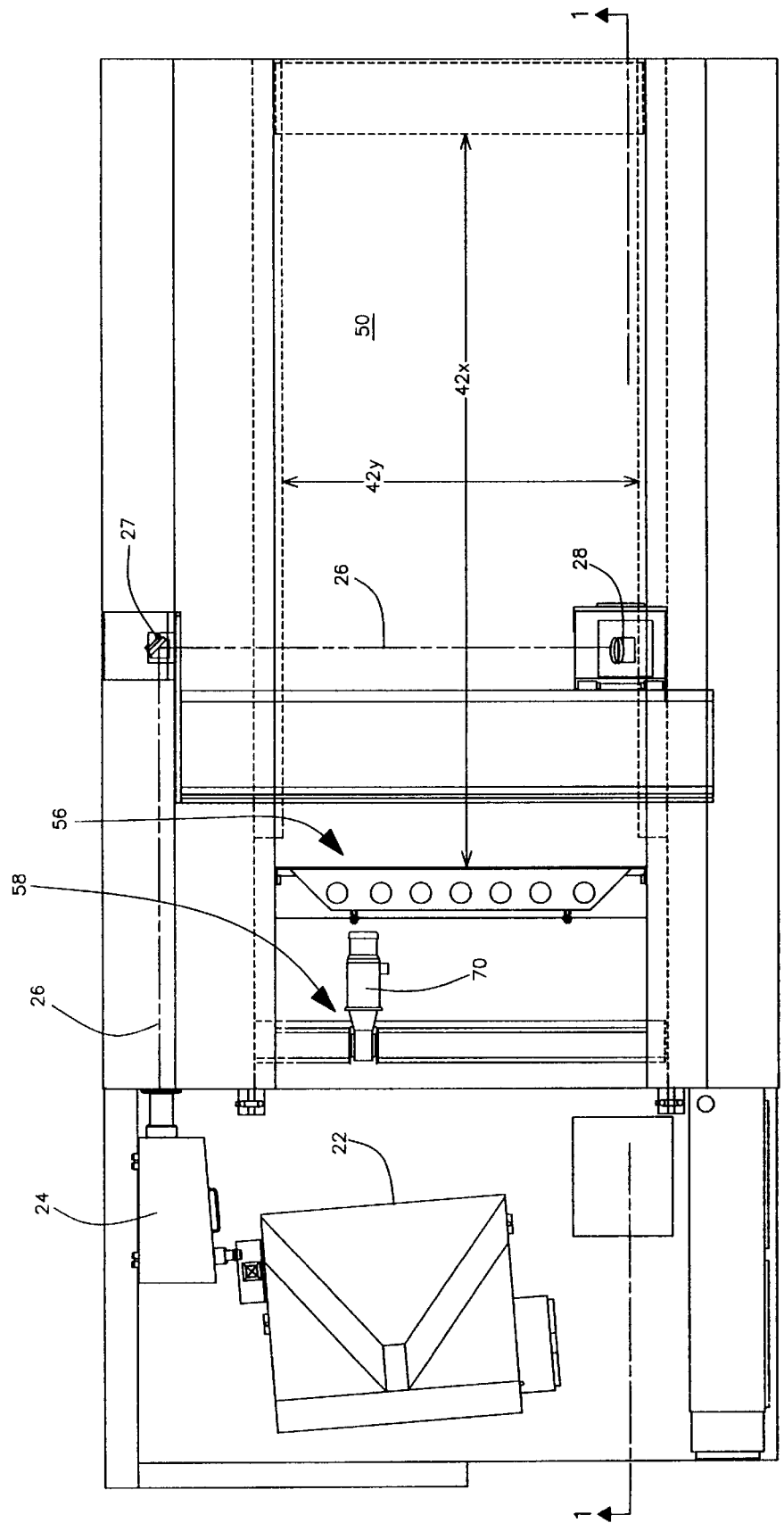
FIG. 2 is a plan view of the machine tool of FIG. 1.

The cutting zone is indicated in FIG. 2 by $42_x$ which indicates the extent along the X-axis which can be traversed by the cutting nozzle, and $42_y$ which indicates the extent along the Y-axis which the cutting nozzle can traverse. The machine tool is provided with a slag collection bed below the cutting zone 42 for the purpose of protecting the machine base from the remnant laser beam and also for the purpose of collecting scrap and slag which falls through the machine bed during the course of cutting parts.

Digressing briefly to FIG. 4, a schematic illustration of an optical system for laser will illustrate the nature of the remnant laser beam. FIG. 4 shows schematically a focusing optic 32 on which is incident the primary laser beam 26, and which is brought to a focus 45 at about the surface of the workpiece 34. A slag collection bed 50 is positioned below the pallet separated by an air space 51 of approximately 18 inches, in a current implementation of the machine. The remnant laser beam 46 is shown as impinging on an area 46a having a sufficiently small diameter to include a dangerous and reasonably high energy concentration in the remnant laser beam 46. For example, if a 5,000 watt laser beam 35 mm in diameter were incident on a lens having a 10 inch focal length, if no workpiece were interposed so that there was no energy absorber in the beam path, at a position 10 inches below the focal point the remnant beam 46 would again be at 35 mm diameter and would have a power of the same level (e.g. 5,000 watts) as the incident beam. At 20 inches from the focal point the remnant beam would be 70 mm in diameter and still have significant and potentially dangerous energy density.

In practicing the present invention, the slag collection bed can be stationary, with scrap removed by a movable mechanism which cooperates with the bed, but which is completely retracted out of the field of the laser during cutting.

The slag collection bed 50 preferable serves as a laser shield to protect the machine base from damage. It is preferably replaceable, and is separated from the machine base by insulation intended to protect the bed from heat generated in absorbing laser energy in the shield. A preferred form of the collection b ed is described in commonly owned co-pending application Ser. No. 09/302,798, pending, the name of William B. Scott (docket number 186364) entitled Insulated Slag Collection Bed for a Laser-Equipped Machine Tool. Suffice it to say for purposes of the present invention that the slag collection surface 50 provides a flat smooth surface for collecting debris from the machining operation. A conventional metal belt conveyor was not adapted because, in high power operation, there is a significant danger of damaging the conveyor or the belt, and thus for simplicity of replacement, moving parts are preferably avoided.

In accordance with the invention, a slag removal apparatus is associated with the stationary bed. The apparatus is shielded from incident laser radiation, and protected from slag, but has access to the entire slag collection surface for removing scrap and slag therefrom. As shown in FIGS. 1 and 2, both a scraper assembly 56 and its drive mechanism 58 are entirely removed from the cutting area and therefore cannot be damaged or destroyed by laser beam 26.

More specifically, scraper assembly 56 is sized to span across collection bed 50 in a lateral direction (along the Y-axis) and includes a replaceable scraping pad 60 which is preferably manufactured from a plastic material having high durability and a low coefficient of friction to facilitate the sliding action of scraper 56 across collection bed 50. Preferably the scraper pad 60 is formed of ultra high molecular weight polyethylene. Drive mechanism 58 is connected to drive scraper 56 from the stowed position shown in FIG. 1 in solid lines to the active position shown in dashed lines in FIG. 1.

Figure 3:
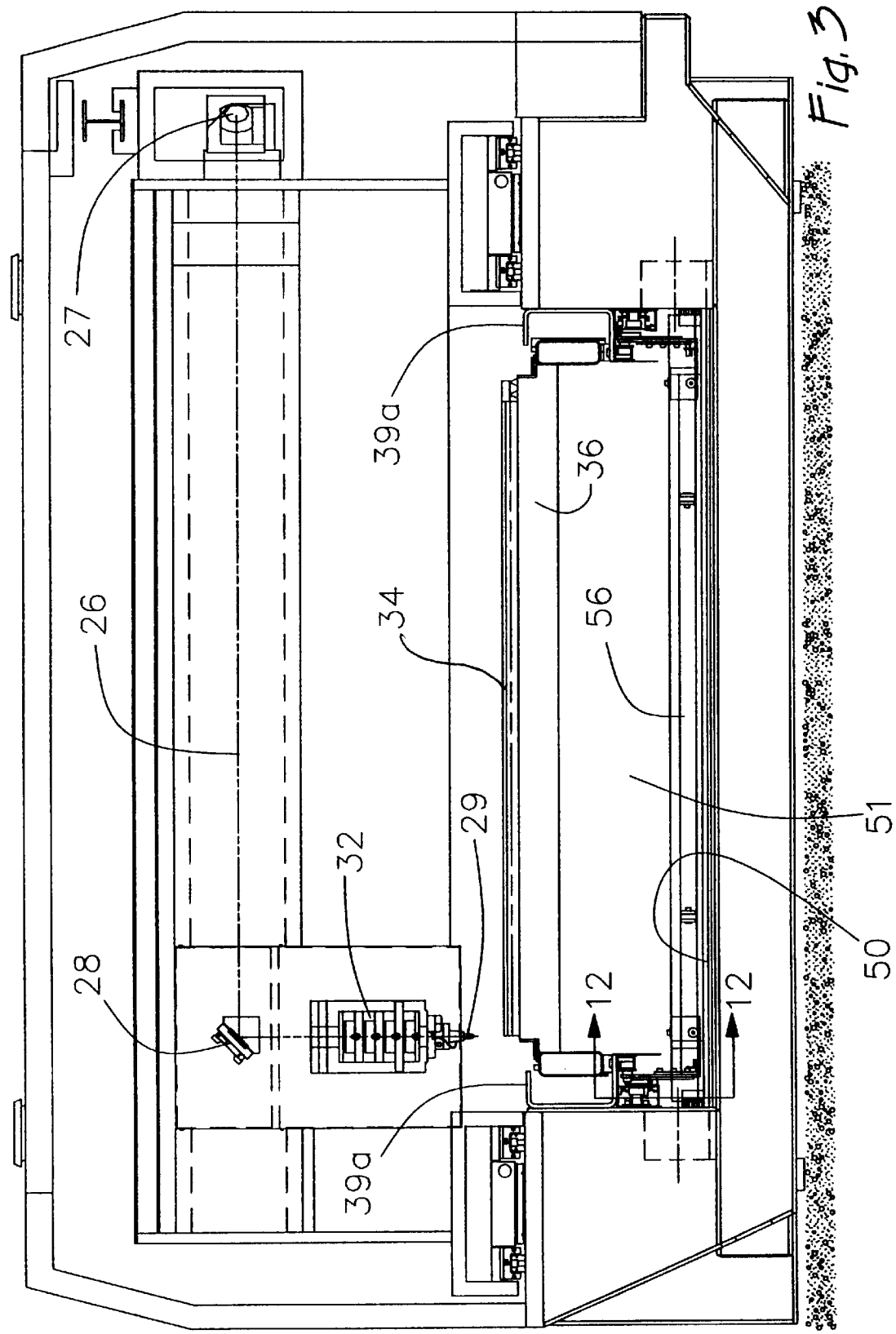
FIG. 3 is an end elevation sectional view of the machine tool of FIG. 1 and further showing the outline of an enclosure for the machining area.
Figure 8:
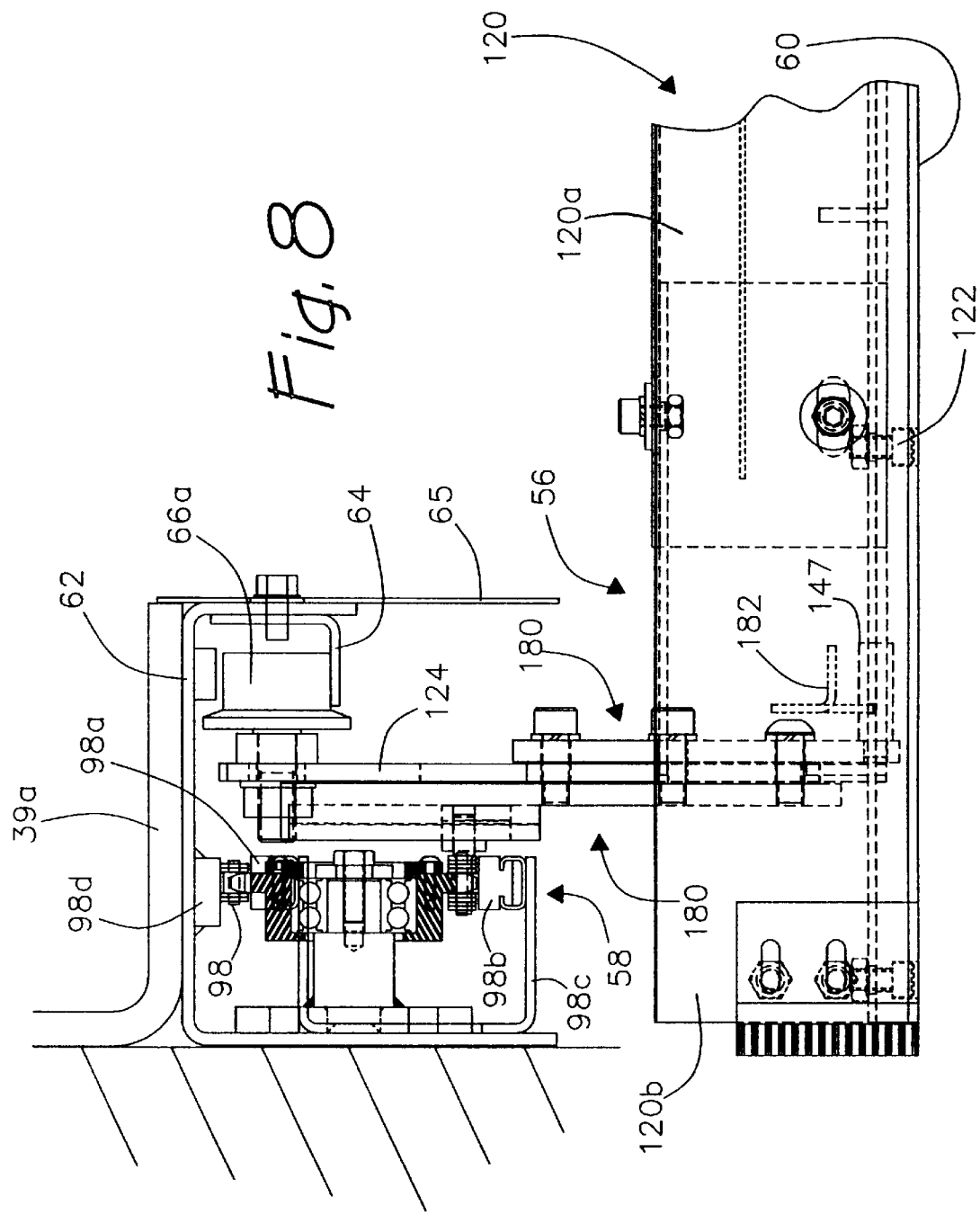
FIG. 8 is a diagram, partly in section, illustrating the left-hand scraper blade drive at the loading station end of the machine.
Figure 9:
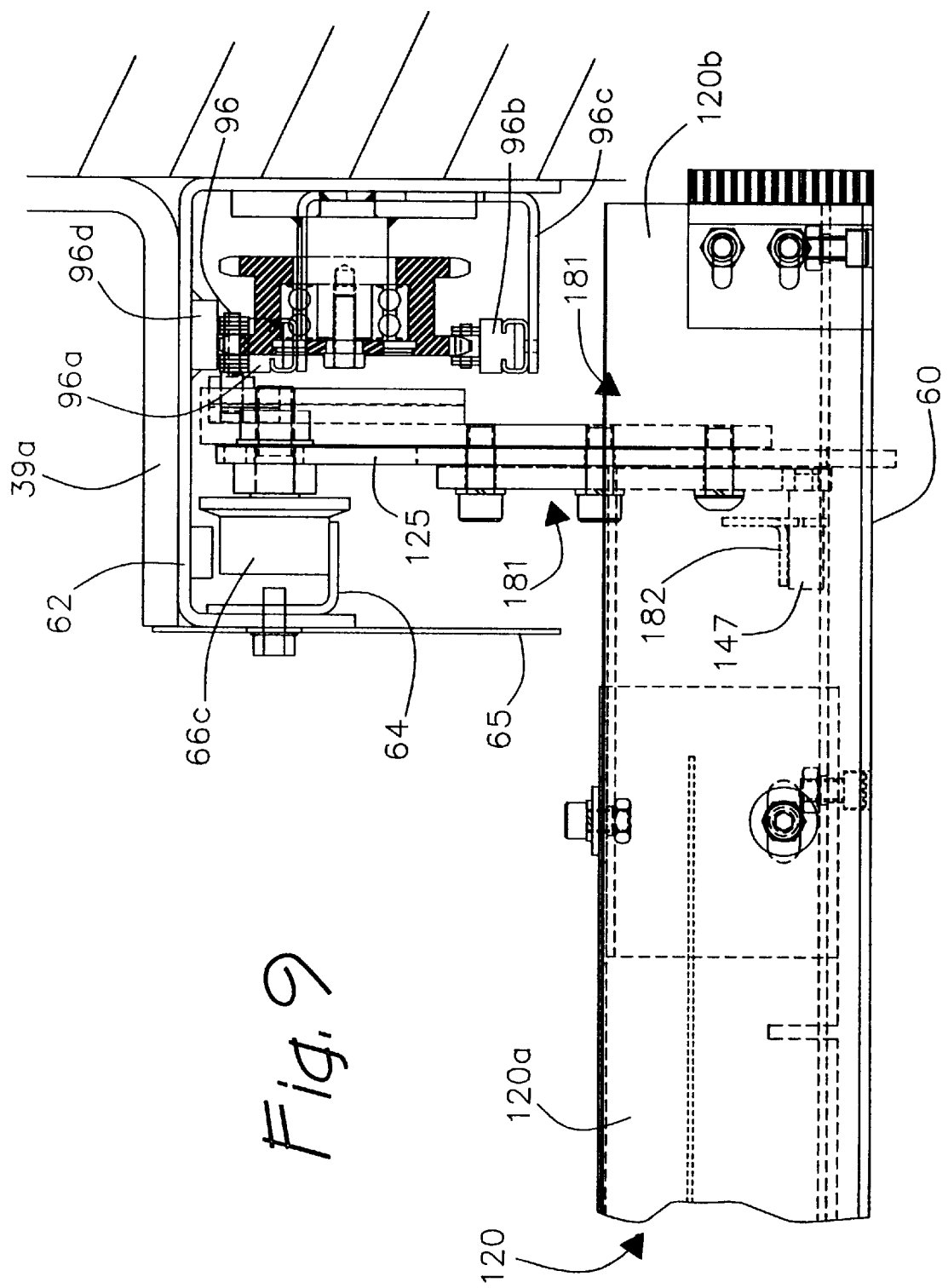
FIG. 9 is a diagram similar to FIG. 8 but illustrating the right hand drive at the end of the bed nearest the laser and with the blade in the raised position.

As shown in FIG. 3, and in further detail in FIGS. 8 and 9, drive mechanism 58 is protected by an angled shroud 62 which supports angular rail 64 across which rollers 66 are able to ride. A shroud 62 and a rail 64 are positioned on each side of the slag collection bed, and are affixed to the inner vertical sidewalls of the machine base beneath a C-shaped member 39a which supports the pallet. The shrouds and the rails extend for the entire length of the machine so as to carry the scraper assembly 56 from its most advanced position at the loading end of the machine to its most retracted stowed position, well out of the path of the laser beam. A depending shield 65 is also attached to the bracket 62, and is removable for service of the drive, but when in position further protects the mechanism from falling debris.

Figure 5:
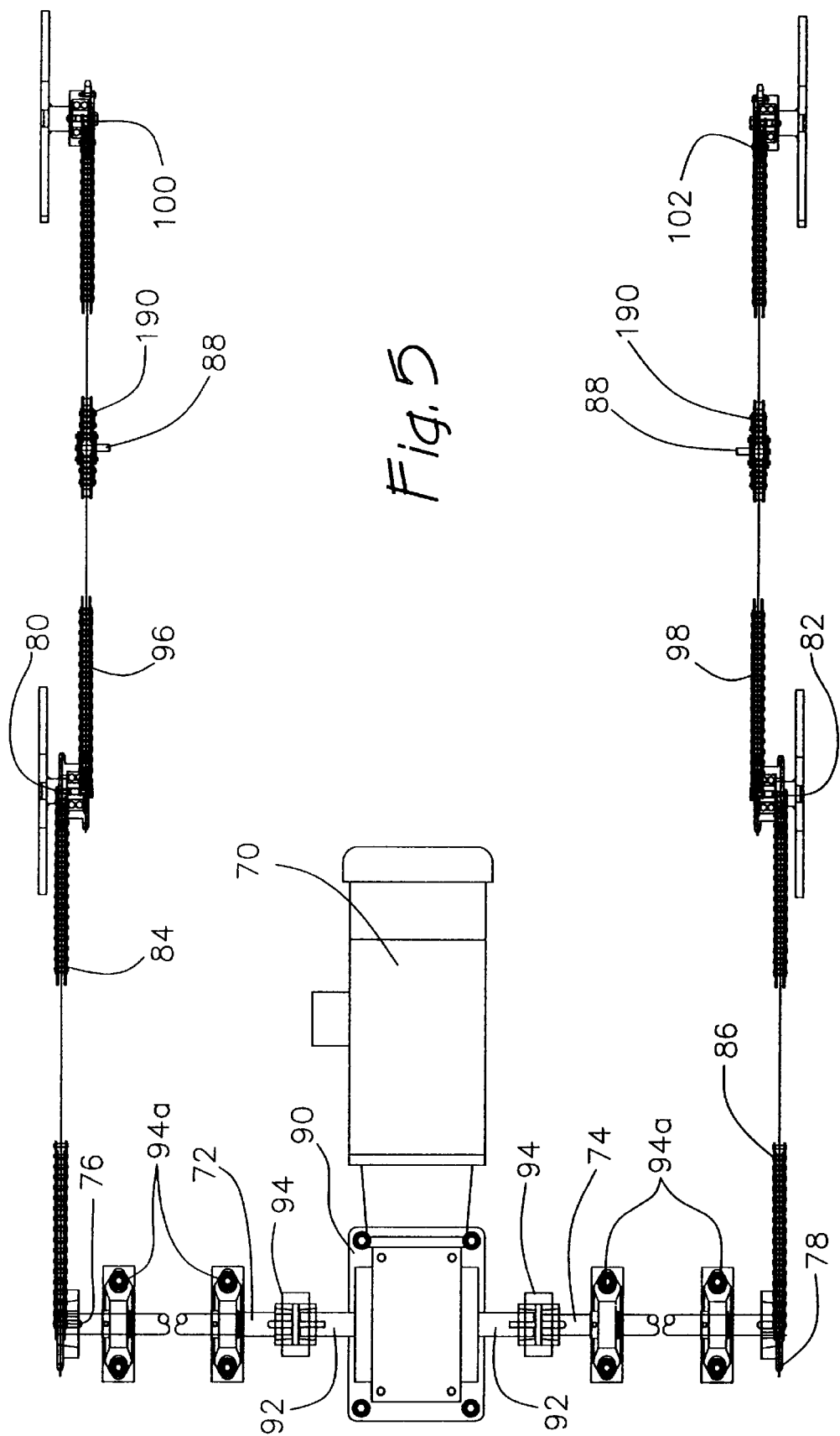
FIG. 5 is a diagram showing a drive system for the scrap removal system of the machine of FIG. 1.
Figure 6:
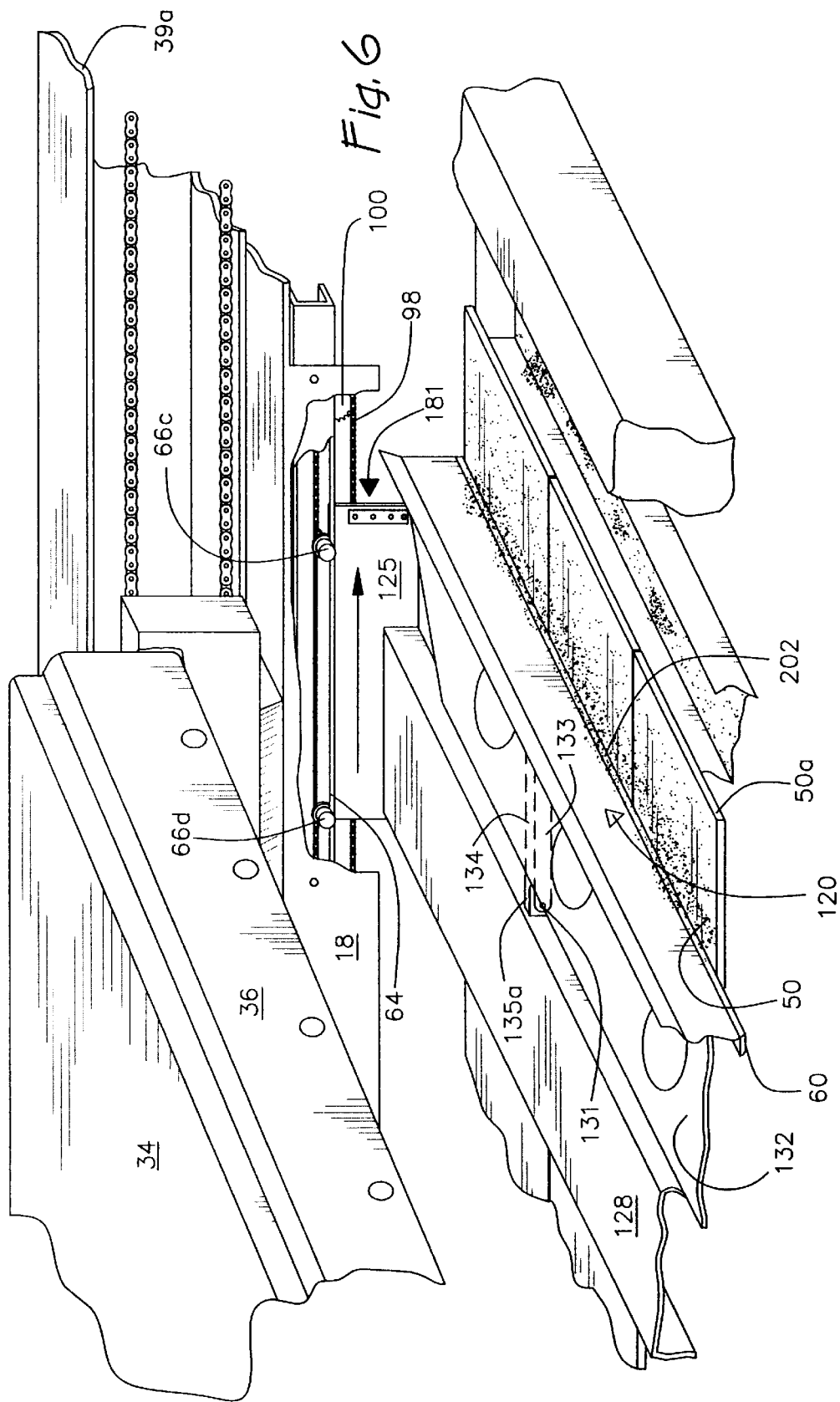
FIG. 6 is a perspective view, partly broken away, of the laser-equipped machine tool of FIG. 1 showing the scrap removal mechanism near the end of a cleaning pass.

Rollers 66, which carry the scraper assembly, are mounted on side plates 124, 125. Recognize that rotation of rollers 66 is passive in the preferred embodiment in that a drive shaft is not directly connected to rollers 66. Rather, in the preferred embodiment, movement of scraper 56 is actuated through motor 70 as best shown in FIGS. 1 and 5. The motor is positioned safely outside of the cutting zone 42 and has a reliable chain drive connected thereto, with the chain runs also being outside of the cutting zone and protected from slag and scrap. As shown in FIG. 5 a reducer 90 is connected to first and second drive shafts 72 and 74, which in turn are connected to single sprockets 76 and 78, respectively, which in turn are connected to double sprockets 80 and 82, respectively, by first and second chains 84 and 86. Rotation of the double sprockets 80 and 82 drives third and fourth chains 96 and 98. As will be described in further detail herein, third and fourth chains 96 and 98 carry actuation pins 88 which engage linkages 180, 181 and thereby raise, lower, and pull scraper 56. Rollers 66 carry the scraper assembly along rails 64.

Referring again to FIG. 5, it can be seen that motor 70 is not directly connected to drive shafts 72 and 74 in the preferred embodiment, but rather, includes gear box or reducer 90 having output shafts 92 which are then connected to drive shafts 72 and 74 via couplings 94. The drive shafts are further supported by bearings 94a. Single sprockets 76 and 78 are connected to double sprockets 80 and 82, respectively, via first and second chains 84 and 86. It can be seen that third and fourth single sprockets 100 and 102 are provided at front end 136 of collection bed 54. Engaged with the third and fourth single sprockets 100, 102 and the corresponding driving sprockets in the double set 80, 82 are third and fourth chains 96, 98, sometimes referred to as the carrier chains. Thus the carrier chains extend from the load station end of the machine past the end 136a nearest the laser. The ends 136, 136a roughly coincide with the aforementioned X-coordinate $^{42}x$ which defines the maximum traverse of the nozzle 29 across the cutting tool. Upper chain guides 96a, 98a and lower chain guides 96b, 98b are carried by C-shaped brackets 96c, 98c. The brackets 96c, 98c are fixed to the associated machine leg with the chain guides underlying the associated upper and lower runs of the respective chains, to prevent the chains from sagging. The chain guides underlie the carrier chains 96, 98 for the length of their run between their driving sprockets, and a similar chain guide underlies the upper run of the input chains 84, 86 interposed between the driven shaft and the driving sprockets 80, 82. In addition, blocks 96d, 98d are positioned to overlie the upper run of the chains 96, 98 so as to trap the chain between the blocks 96d, 98d and the upper chain guides 96a, 98a to prevent the weight imposed on the upper run during the retraction cycle, when the forward end of the plow is being carried, from causing the chain to derail.

The motor 70, when energized, drives through the gear box and the drive shafts to the input chains 84, 86. The input chains drive the double sprockets 80, 82 which in turn drive the carrier chains 96, 98. The carrier chains 96, 98, as will be further described below, control the movement of the scraper assembly 56 across the machine. That control is achieved by the carrier chains 96, 98 which produce in sequence a cleaning pass (from end 136a to end 136) with the plow in contact with the bed, a lifting operation which raises the plow above the slag collection surface, and a retraction pass which returns the plow to its home protected position prior to the next cycle. This is accomplished by means of a simple and reliable drive and drive motor which need not be reversible.

It is important to understand that the depiction of FIG. 5 is but one embodiment of the present invention, and that in alternative embodiments, other drive mechanisms are possible and that the location of the motor 70, and use and location of gear box 90, as well as the various drive shafts, sprockets, and chains, can be altered and still fall within the scope of the present invention. What is important to understand is that the entire drive mechanism is provided outside of the cutting area and is therefore outside the lateral and longitudinal movements of laser beam 26.

With the overview of the drive assembly, positioned and shrouded so that its elements are protected from the laser and from scrap, now understood, attention will be directed to the details of the scraper assembly 56. Those details will best be appreciated with reference to FIGS. 6–9.

Figure 7:
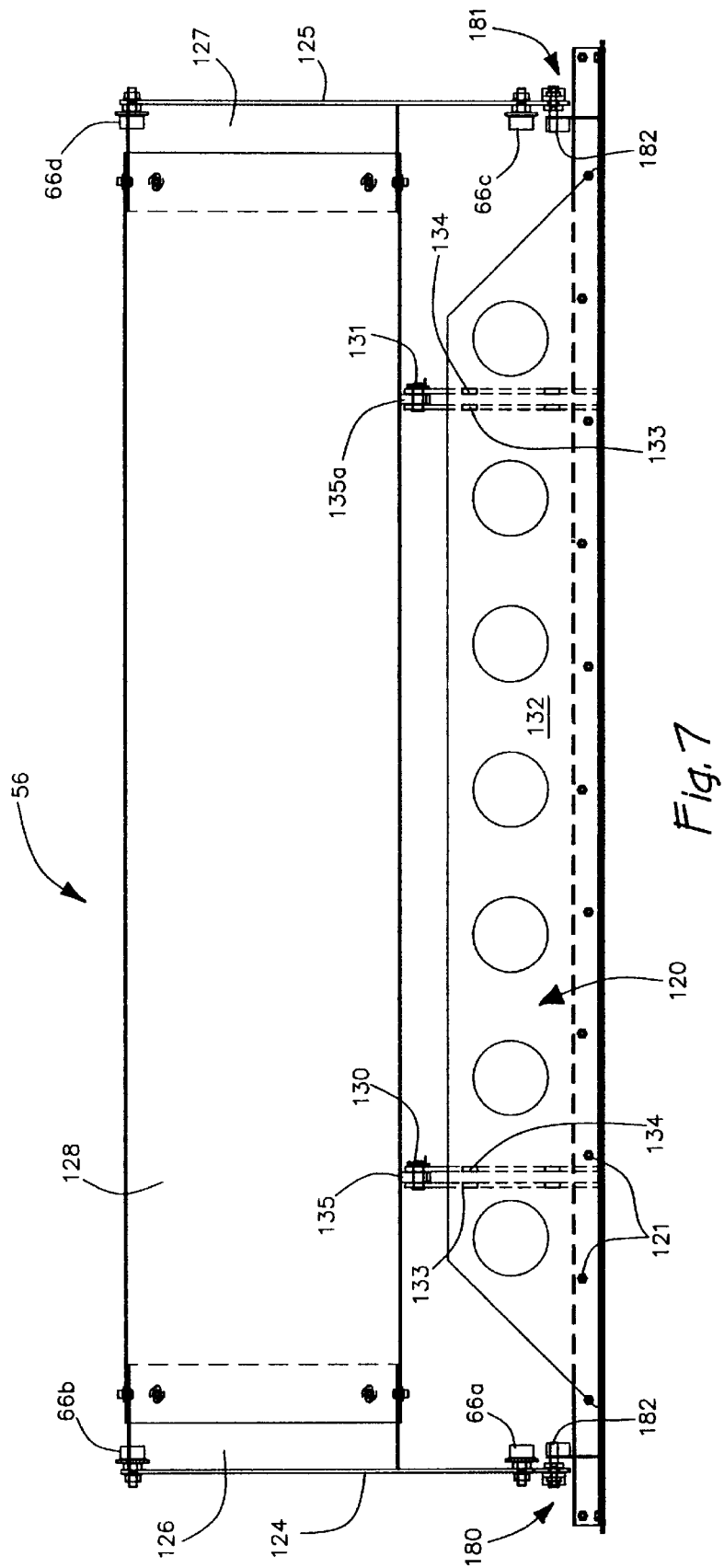
FIG. 7 is a plan view showing the scraper assembly elements of a preferred form of scrap removal system.

The main functional element of the scraper 56 is a plow assembly 120 which carries, at its lower edge, the scraper pad 60. FIG. 7 shows threaded weld nuts 121 adapted to receive fasteners 122 (FIG. 8) for fixing the scraping pad in place. The plow assembly 120 is carried fore and aft in performing its scraping and retraction function by a pair of end plates 124, 125. Rollers 66a–66d ride on the aforementioned track 64 (FIG. 8) to carry the end plates 124, 125 along the path established by the track. For rigidifying the scraper assembly, the end plates 124, 125 have inwardly projecting flanges 126, 127 secured to a fabricated beam 128 which fixedly connects end plates 124, 125 together and provides attachment points and a pushing member for the scraper assembly. The end plates and interconnecting member 128 are sometimes collectively referred to herein as the scraper base. The fabricated beam 128 can simply be a C-shaped section, internally braced as necessary to provide structural rigidity.

End plates 124, 125, carried by the rollers 66 on the tracks 64 support beam 128 slightly above the surface of the slag collection bed 50. This base assembly is carried back and forth along the tracks in a linear path under motive power transmitted by the drive chain. The plow assembly 120 is affixed to the beam pivots 130, 131. Plow 120 carries upstanding blade 120a, below which the scraper pad 60 is mounted, and a rigidifying flange 132 extending back toward beam 128. Two sets of paired spaced arms 133, 134 project from the back of the plow 120 and embrace apertured blocks 135, 135a on beam 128. A pivot pin 130, 131 is inserted through aligned apertures so that the plow 120 can pivot with respect to the beam. A linkage mechanism 180, 181 is arranged at the forward end of plow 120 and is adapted to controllably raise and lower the plow under control of the chain drive. For that purpose, affixed to the backside of the plow are lifting pads 182 adapted to be engaged by lifting pins 147 on each linkage 180, 181.

Figure 12A:
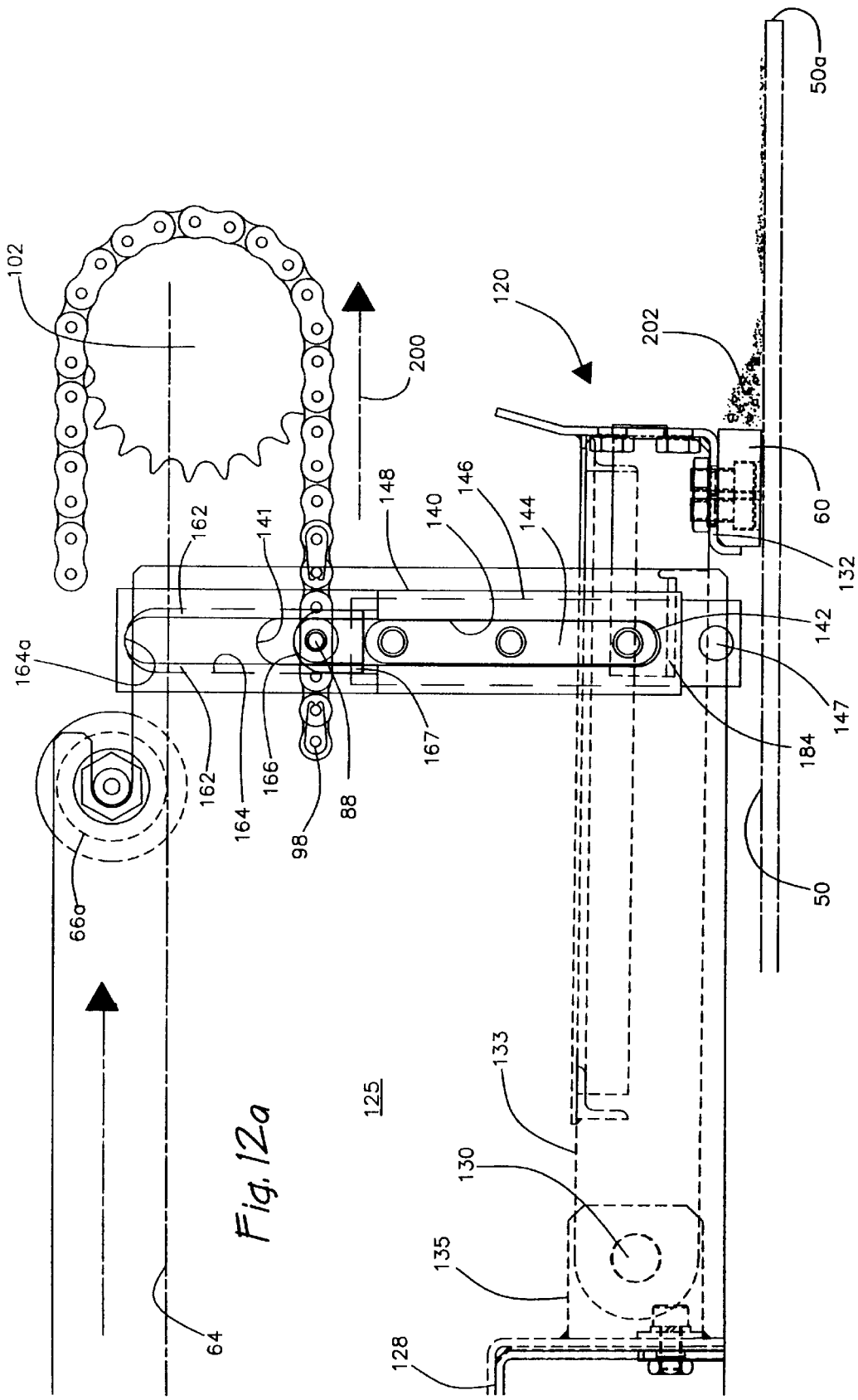

The linkage is shown in front elevation in FIGS. 8 and 9, in end elevation in the sequential diagrams beginning with FIG. 12a, and in exploded view in FIG. 10. Referring primarily to the exploded view, but with reference to the front and end elevations for orientation, it will be appreciated that the end plate 124 has an elongated slot 140 formed therein, the upper and lower extremities of the slot being indicated by reference number 141, 142. An elongated key 144 is sized to fit within the slot 140 and to be able to freely move and up down along the slot. The key is slightly thicker than end plate 124, so that additional members may bracket the key, be affixed together, then slide up and down along the slot as a unit. The additional members include a lifting bracket 146 and actuator plate 148. These elements and the key are attached by bolts 150 engaging threaded apertures in the bracket 148, to sandwich the lifting bracket 146, the key 144 and the actuator plate 148, with the key fitting slidingly within the slot 140. The bracket 148, key 144 and plate 146 thus can move up and down in slot 140 in end plates 124, 125. The slot is made somewhat longer than the required amount of travel of the vertical linkage to accommodate for wear of the pad and tolerances.

End plate 124, as noted previously, is carried by rollers, one of which 66a is illustrated in FIG. 10. The roller has a shank 152 which passes through a spacer 152a then through an aperture 154 in the plate 125, whereupon it is fixed in place by a flanged nut 155.

The actuator plate 148, has a T-slot shaped channel 164 with a closed top 164a. A solid back 161 and overhanging flanges 162 form the T-slot 164 in which rides an enlarged flange portion 167 of a drive shoe 166. The shoe 166 can move up and down in T-slot 164 while being retained by overhanging flanges 162. The shoe has an aperture 168 in which is inserted an actuator pin 88 carried on the drive chain. The shoe 166 has two normal operating positions within its slot 164. In a lowermost position, below that illustrated in FIG. 10, it serves to carry the scraper mechanism forward in a cleaning pass to remove debris from the slag collection bed. In its uppermost position, above that shown in FIG. 10, it serves to carry the scraper assembly back to its home position on a retract pass. It is the movement between those two positions which is of interest in lifting the plow from its operative position in contact with the slag collection plate, to its raised position in which it can be retracted without pulling scrap back into the machine.

The purpose of the linkage can be best understood with reference to FIG. 8. There it is shown that the plow assembly 120 has an extended section 120b which extends to the upstanding machine sidewall, and thus runs below the supporting angle 62 and protective shield 65 which cover the drive mechanism. It is preferred to limit the height of the drive mechanism, and thus to position the drive elements fairly close to the top of the plow assembly. That leaves a limited amount of room, in some cases on the order of just over an inch, for raising the plow, without having the extended portion 120b interfere with the drive elements. It is necessary to utilize sprockets appropriately sized for the drive chain, and those sprockets are greater than one inch in diameter. The linkages 180, 181 therefore provide a lost motion mechanism which will translate the several inch rise of the drive pin 88 when it goes from the lower to the upper run of the chain, into a lift of only about an inch for the end of the plow assembly.

The manner in which that is accomplished will be best understood with reference to the sequential diagrams of FIGS. 12a–12e. In these figures, certain elements such as the key 144, slot 140 and lifting pin 147, which technically should be shown in hidden lines, are shown in solid lines for clarity. The chain 98 is always driven in the same direction, counterclockwise as shown in these figures, as denoted by arrow 200. The chain carries a drive link set 190 whose details are illustrated in FIGS. 11a and 11b. Those figures show a normal section of drive chain 98 having affixed thereto a special link set 190. The link set includes a drive pin 88 affixed to a reinforced center link 192. The strength of the center link 192 is enhanced by utilizing multiple end plates 193, 194 riveted in place, to prevent the pin 88, also riveted in place, from retracting from the aperture 195 which carries it. Connector links 196 secure the special link set 190 to the remainder of the chain run 98. There is one drive link on each of the driving chains 96, 98, and they are arranged opposite one another as suggested in FIG. 5 to carry the scraper assembly forward or backward as will now be described.

As shown in FIG. 12a the drive pin 88 is engaged in the aperture 168 in the drive coupling 166 which is riding in its lower position in its slot 164. The length of the key 144 within its slot 140 maintains the linkages 180, 181 substantially perpendicular to the end plates 125, 126, which it is recalled are supported by rollers 66 riding on tracks represented by the dashed line 64. The plow assembly 120 is shown in its operative position with the scraper pad 60 in contact with the slag collection bed, and moving a collection of debris indicated at 202 to the right. It is noted that the scraper pivot 130 is indicated at the left of the drawing and is attached to beam 128 which acts as a pusher. As the chain drives toward the end of the slag collection bed as indicated by the arrow 200, the drive pins 88 are the driving members which act through the drive shoes 166 and the linkages 180, 181 to carry the entire scraper arrangement forward, with the scraper pad 60 in contact with the bed.

Figure 12C:
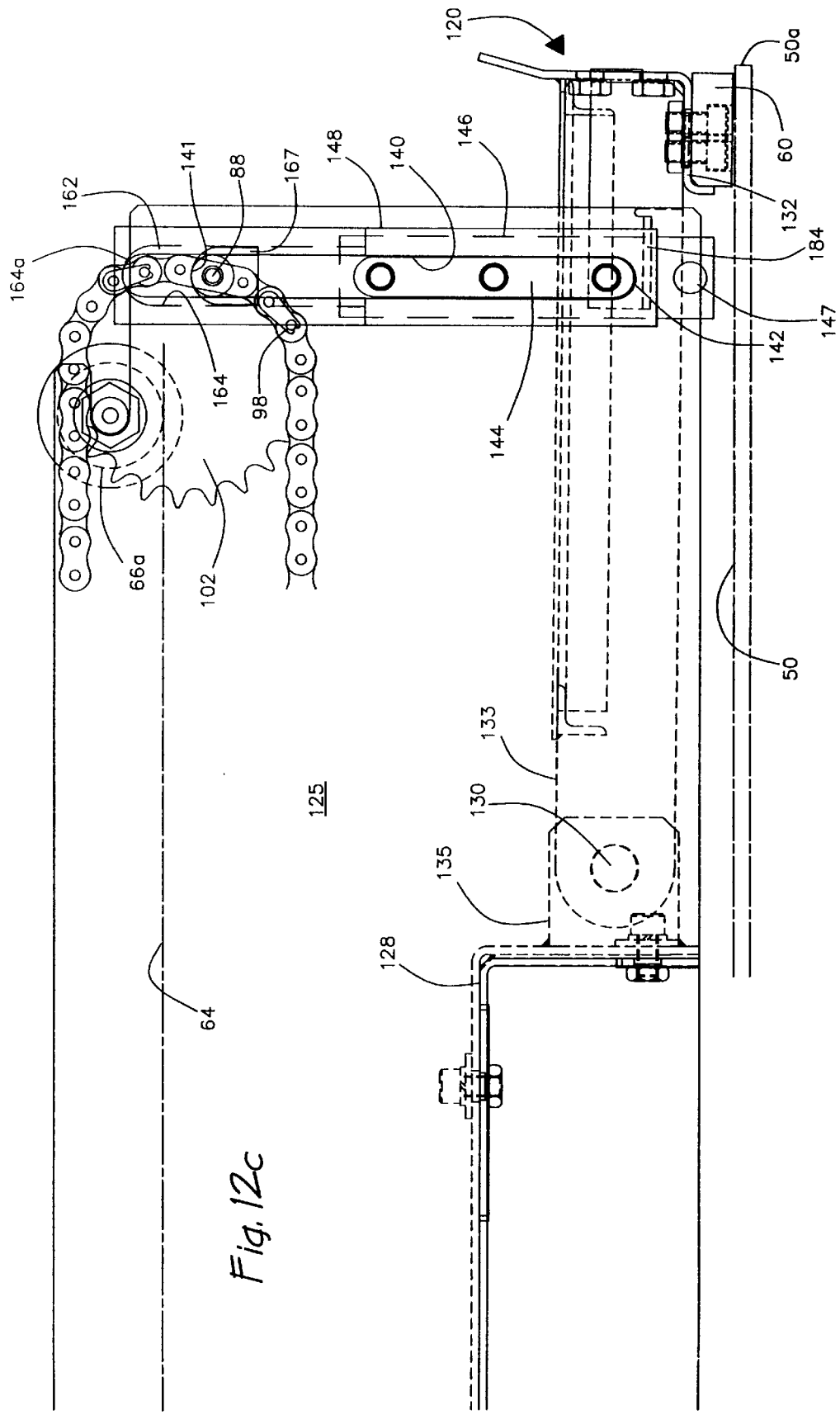

FIG. 12b shows the arrangement nearing the end of the cleaning pass where the linkage has reached the sprocket 102. The scraper pad 60 is now approaching the end 50a of the slag collection bed. As the chain continues to rotate, the drive pin is now moved slightly further forward, by the distance of the radius of the sprocket, and also begins to lift. It will be seen that the drive shoe 166 begins to raise in its slot 164, but for the initial degree of travel, including that shown at FIG. 12c, is without effect on the scraper blade, except that the scraper blade is carried forward to the end of the bed to push the debris into a collection bin. As the chain continues to rotate, however, the drive shoe 166 is further raised by the drive pin 88 until the shoe 166 reaches the top 164a of the slot 164. At that point farther upward travel of the shoe 166 lifts the actuator bracket 148. The actuator bracket is attached through the key 144 to the lifting bracket 146, so that the key 144 slides within its slot 140 in the plate 125. The plate 125 maintains its normal position, but the linkage mechanism rises, pulling the key 144 upwardly in its slot 140, to raise the lifting pin 147. As shown by concurrent reference to FIG. 9 and FIG. 12d, the lifting pin 147 contacts the lower surface of the lifting bracket 184, and raises the front end of the plow. The plow assembly pivots about the pivot point 130, so that the entire assembly including beam 128 and end plate 125 remain in their normal orientation, but only the front end 120 of the plow is lifted. As the chain continues to drive, the pin 88 reaches the upward run as shown in FIG. 12e, for translation on a retract pass back to the original home position, at the double sprocket. When the scraper returns to its home position, out of the path of the laser, the drive motor is deenergized, allowing the scraper to remain in a shielded position until the next cycle is triggered.

It is convenient when using a loading system as in the illustrated machine to operate the scraper assembly when changing pallets. A pallet drive is utilized to remove a pallet which has been completely processed from the machine after the workpiece on it is cut, to transfer it to a pallet preparation station (not shown), then to load a second pallet with a new workpiece into the machine. While those operations are underway, the numerical control or the operator can actuate the scraper assembly to make a pass across the slag collection bed and scrape the debris from the system during the pallet unload and load cycle.

It will now be seen that what has been provided is a scrap removal system for a high-power laser which is completely shielded from the path of the laser during cutting. The drive extends along the length of the bed on both sides thereof, but laterally outside of the path of the laser. The prime mover for the drive is also positioned so that it engages both drive members but is also in a shielded location. A reasonably light but adequately rigidified scraper assembly is carried across the slag collection bed by the drive members. The plow of the scraper assembly extends across the full width of the machine so that slag is removed in a single pass in a highly efficient manner. A low friction pad at the bottom of the plow rides along the surface of the bed to push the scrap and debris to the open end of the machine base. Linkages connect the scraper assembly to the lateral drives and are configured so that the drives carry the plow through the system on a cleaning pass, raise the plow out of contact with the slag collection bed, return the raised plow to its original home position, then lower the plow prior to commencing the next cleaning pass. The elements of the drive are not only simple and shielded but they are accessible for service, and the slag mechanism can operate reliably over a long period of time. If a malfunction occurs, the mechanism can be readily serviced without creating significant machine down time.

What is claimed is:

1. A scrap removal system for a laser-equipped machine tool having a cutting head which traverses over a cutting zone for performing cutting operations on a workpiece, and having a scrap collection surface underlying the cutting zone for collecting scrap, the scrap removal system comprising in combination:

a drive system having a motor driving a pair of lateral drives which extend from a home position outside the cutting zone over the length of the scrap collection surface, the lateral drives being positioned at respective sides of the scrap collection surface but out of the cutting zone;

a scraper assembly mounted for translation
(a) in one direction from the home position into the cutting zone for performing a cleaning pass over the scrap collection surface from end to end thereof;
(b) in the opposite direction to the home position on a retract pass;

a first and a second linkage connecting the lateral drives to the scraper assembly for imparting motive force thereto for the cleaning and retract passes;

a plow section pivotally attached to the scraper assembly and having a scraper portion in contact with the slag collection surface during the cleaning pass; and the linkages being connected to lift the scraper portion out of contact with the slag collection surface during the retract pass.

2. The combination of claim 1 in which the lateral drives are chain drives each carrying a drive link for connection to the associated linkage.

3. The combination of claim 2 wherein the chain drives are located out of the cutting zone and further include overhanging shields for protecting the drives from debris produced during cutting.

4. The combination of claim 3 wherein the scraper assembly includes a pair of end plates having rollers thereon carried by tracks affixed to the shield, the end plates being connected by a rigidifying member providing stability to the plow section across the width of the scrap collection surface.

5. The combination of claim 3 wherein the scraper assembly includes a base member having rollers engaging a fixed track for supporting the scraper assembly for translation, the plow section being pivotally connected to the base section.

6. The combination of claim 5 in which each linkage includes a key fitting into a respective slot in the associated end plate, and a lifting surface on the linkage for raising and lowering the scraper portion of the plow section.

7. The combination of claim 5 wherein the linkage further comprises a shoe translatable in a second slot in the linkage, a drive pin on the drive chain and drivingly engaging the shoe, the shoe adapted to translate the linkage upwardly when the chain transitions around a sprocket from a lower run to an upper run, raising of the linkage serving to raise the scraper portion out of contact with the scrap collection surface.

8. The combination of claim 3 in which the linkage includes a lost motion mechanism so that as the drive pin transitions around a sprocket from a lower to an upper run, the scraping surface is raised a lesser amount for clearance from the overhanging shield.

9. The combination of claim 8 in which the scraping surface comprises a synthetic strip exhibiting a low coefficient of friction with the scrap collection surface.

10. The combination of claim 1 in which the scraping surface comprises a synthetic strip of low coefficient of friction material affixed to the bottom of the plow.

11. A scrap collection and scrap removal system for a laser-equipped machine tool, the machine tool having a cutting head which traverses over a cutting zone for performing cutting operations on a workpiece, the system comprising:

a stationary scrap collection surface underlying the cutting zone for collecting slag and scrap produced during cutting;

a scrap removal drive having a prime mover out of the cutting zone and a pair of lateral drives extending from a home position out of the cutting zone over the length of the scrap collection surface adjacent thereto and out of the cutting zone; and a scraper assembly spanning the scrap collection surface from side to side and being attached to the drive means, the scraper assembly having a scraping surface at the forward end for pushing scrap along the scrap collection surface during a cleaning pass and being pivotable to raise the scraping surface above the scrap collection bed during a retract pass to the home position.

12. The combination of claim 11 wherein the scrap removal apparatus includes a plow adapted to push the scrap off of the collection surface, the plow being mounted and driven such that it traverses a box-like motion defined by a cleaning pass in engagement with and across the collection surface, a second motion perpendicular to the cleaning pass wherein the plow is lifted from the bed, a retract pass parallel to the first motion for retracting the plow across but out of contact with the collection surface, and a fourth motion perpendicular to the retraction pass wherein the plow is lowered to the collection surface and thereby positioned for subsequent box-like motions.

13. A scrap removal system for a laser-equipped machine tool having a cutting head which traverses over a cutting zone for performing cutting operations on a workpiece, and having a scrap collection bed underlying the cutting zone for collecting scrap, the scrap removal system comprising in combination:

a motor in a protected area driving a pair of lateral chain drives extending from a home position over the length of the collection bed to an extended position adjacent the end thereof, the chain drives being positioned outside the cutting zone and shielded from scrap generated during cutting;

a scraper assembly normally maintained in a home position and having end members mounted to be drawn along rails from the home to the extend positions;

a plow section pivotally attached to the scraper assembly with a lead scraper portion operable between a cleaning position in contact with the bed and a raised position out of contact with the bed;

the lateral chain drive being connected to the scraper assembly for pulling the scraper assembly across the collection bed from the home to the extended positions with the scraper portion in contact with the bed during a cleaning pass; and linkages actuated by the chain drives for pivoting the plow section to raise the scraper portion above the collection bed during a retract pass to the home position.

14. The combination of claim 13 in which the linkages include lost motion mechanisms for limiting the extent of the rise of the scraper portion.

\* \* \* \* \*